(12) United States Patent
Hutchinson

(10) Patent No.: US 7,077,423 B2
(45) Date of Patent: Jul. 18, 2006

(54) REDUCED SIZE FOLDING STROLLER

(75) Inventor: James M. F. Hutchinson, Mohnton, PA (US)

(73) Assignee: Wonderland Nurserygoods Co. Ltd., Taipei (TW)

(*) Notice: Subject to any disclaimer, the term of this patent is extended or adjusted under 35 U.S.C. 154(b) by 81 days.

(21) Appl. No.: 10/914,742

(22) Filed: Aug. 9, 2004

(65) Prior Publication Data

US 2005/0046152 A1 Mar. 3, 2005

Related U.S. Application Data

(60) Provisional application No. 60/498,268, filed on Aug. 26, 2003.

(51) Int. Cl.
B62B 7/10 (2006.01)
B62B 7/06 (2006.01)

(52) U.S. Cl. ............... 280/649; 280/642; 280/644; 280/647

(58) Field of Classification Search ........ 280/647–650, 280/47.371, 641–644, 639, 658, 38, 47.38, 280/655, 655.1; 16/113.1
See application file for complete search history.

(56) References Cited

U.S. PATENT DOCUMENTS

| | | | | |
|---|---|---|---|---|
| 3,075,783 A | * | 1/1963 | Flam | 280/650 |
| 3,084,949 A | * | 4/1963 | Forster et al. | 280/650 |
| 4,032,173 A | * | 6/1977 | Clegg | 280/650 |
| 4,369,986 A | * | 1/1983 | de la Fe | 280/644 |
| 4,768,795 A | * | 9/1988 | Mar | 280/30 |
| 4,832,354 A | * | 5/1989 | LaFreniere | 280/30 |
| 5,388,852 A | * | 2/1995 | Bigo et al. | 280/642 |
| 5,624,152 A | * | 4/1997 | Yoshie et al. | 297/184.13 |
| 5,625,923 A | | 5/1997 | Huang | |
| 5,655,260 A | * | 8/1997 | Chang | 16/113.1 |
| 5,864,921 A | * | 2/1999 | Chou | 16/405 |
| 6,312,005 B1 | * | 11/2001 | Lin | 280/647 |
| 6,386,575 B1 | * | 5/2002 | Turner | 280/647 |
| 6,533,311 B1 | * | 3/2003 | Kaneko et al. | 280/647 |

\* cited by examiner

*Primary Examiner*—Christopher P. Ellis
*Assistant Examiner*—Vaughn Coolman
(74) *Attorney, Agent, or Firm*—Martin Fruitman

(57) ABSTRACT

The apparatus is a reduced size baby stroller with a structure that counteracts the usual lengthening when the stroller is folded. The rear wheels of the stroller are interconnected with the front legs and attached to the rear legs by a pivoting wheel link so that the rear wheels do not separate from the front wheels when folded, but instead pivot out of alignment with the rear legs. The stroller handles are mounted on tubes that can telescope inward because all the attachments to the outer tubes are made by external fixtures that do not penetrate into the interior of the tubes, and the canopy can also slide inward when the stroller is folded because the canopy frame is mounted on a fixture with a track.

4 Claims, 5 Drawing Sheets

REDUCED SIZE FOLDING STROLLER

BACKGROUND OF THE INVENTION

This application is based upon provisional patent application Ser. No. 60/498,268 filed Aug. 26, 2003.

The invention deals generally with folding baby strollers and more specifically with a folding baby stroller which folds into a reduced size.

The size of a folded baby stroller is very important to the adults using them because of the frequent need to transport such strollers in automobiles, and somewhat less frequently on planes, buses and trains. Furthermore, the folded size is also significant in the sales of strollers because a smaller size reduces shipping costs.

Many prior art designs for strollers have satisfactory dimensions in their folded thickness and width, but the length dimension makes handling the folded stroller cumbersome. The problem is that when the typical stroller is folded, the rear wheels stick out one end of the configuration, and the handle and canopy stick out the other end with a total length that is actually longer than the unfolded stroller.

It would be very beneficial to have a stroller that has a substantially reduced folded length compared to those strollers of the prior art.

SUMMARY OF THE INVENTION

The present invention uses several design approaches to reduce the length of the folded stroller. First, the rear wheels are maintained at their original distance from the front wheels rather than, as in the prior art, moving farther from the front wheels than when the stroller is upright. The classic folding geometry looks from the side view very much like an inverted "Y" with a pivot at the junction point of the lines of the "Y". The rear wheels are on the rear legs and the front wheels are on the front legs at the bottom of the inverted "Y". Thus, in the prior art when the pivot at the junction point of the "Y" is pushed down to fold the stroller, the rear legs and rear wheels separate further from the front legs and front wheels.

However, the present invention divides the rear legs into two pivotally connected segments, the rear legs, just below the junction of the "Y", and the rear wheel links, which extend below the rear legs, are at the bottom of the "Y" structure and hold the rear wheels. The rear wheel links are also interconnected to the front wheel legs with rigid basket supports. Therefore, when the junction points of the "Y"s are pushed down, although the rear legs still separate from the front legs, the rear wheels are maintained at essentially the same original distance from the front wheels, and the rear wheel links rotate relative to the rear legs as the rear legs are separating from the front legs. Thus, while on prior art strollers the spread between the rear wheels and the front wheels increases as the strollers are folded, in the present invention there is no such increased spread, and the folded length is reduced accordingly.

Another design change to reduce the folded length is the use of telescoping handles on the stroller. In the prior art, the handle, which, when the stroller is folded, pivots toward and past the front wheels, contributes to the overall length of the folded stroller. The use of telescoping handles seems like an easy solution, but most strollers have unique structural requirements that have previously made the use of telescoping handles difficult. Baby strollers require substantial bracing between the frame sections on opposite sides of the stroller to prevent collapse of the stroller when the weight of a child is supported between the side frame sections. The typical means for attaching bracing and child support structures between the side frame sections has been to fasten such members through the tubing on both sides of the structure. While this works quite well from a structural standpoint, the fasteners through the tubing prevent any use of the interior of the tubing as a part of a telescoping structure.

The present invention therefore uses specifically designed fixtures on the outside of the lower outer tubes into which the upper handle tubes slide. These fixtures, while keeping the interior of the lower outer tubes clear of obstructions, furnish support for the rear legs and for the rear "X" support, which connects the stroller's sides and permits the folding in its width dimension. Furthermore, although the fixtures do not intrude into the lower outer tubes, they are constructed to prevent any slippage of the fixtures themselves relative to the lower outer tubes.

A third design feature of the reduced length stroller permits moving the canopy that is normally located over the baby's seat to a location inward toward the center of the folded stroller to prevent the canopy from also extending beyond the front wheels of the folded stroller. This is accomplished by adding a track, on which the canopy frame slides, to the fixtures on the exterior of the lower outer tubes. When the stroller is to be folded the canopy is lowered over its track, thus locating the canopy closer to the center of the stroller when the stroller is folded. Furthermore, this design feature also yields the benefit of an adjustable height canopy when the stroller is upright.

DETAILED DESCRIPTION OF THE INVENTION

Figure 1:
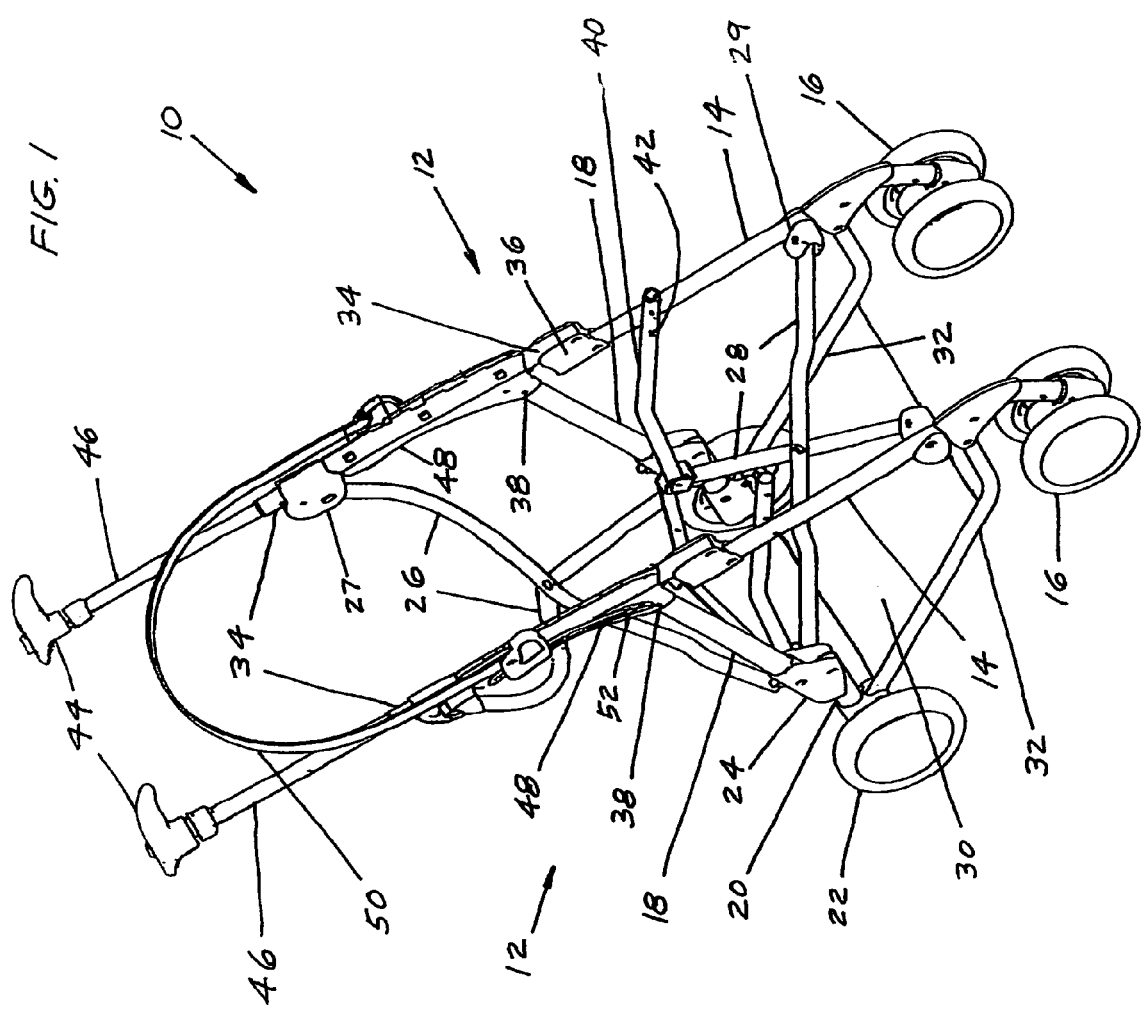
FIG. 1 is a perspective view of the stroller frame of the preferred embodiment when it is completely open and in operating condition.

FIG. 1 is a perspective view of stroller frame 10 of the preferred embodiment when it is completely open and in operating condition. The basic side frame sections 12 can be seen on both sides of stroller frame 10, and each side frame section 12 includes front leg 14, to which front wheel 16 is connected, and rear leg 18. The upper end of rear wheel link 20, to which rear wheel 22 is attached, is connected to rear leg 18 at pivot fitting 24.

Rear "X" support 26 and bottom "X" support 28 are connected to side frame sections 12 at "X" pivot fixtures 27 and 29 respectively so that stroller frame 10 can be folded in the width dimension, but are only of minor significance to the present invention. Accessories basket 30 is located at the bottom of the stroller frame and is supported by basket supports 32 attached at the bottoms of side frame sections 12. Accessories basket 30 is constructed of flexible material so that it folds when stroller frame 10 is folded in its width dimension.

Lower outer tubes 34 are attached to front legs 14 at pivot fitting 36 and form the lower portion of the handle structure. With rear legs 18 attached to lower outer tubes 34 at pivot points 38, the configuration of lower outer tubes 34, front legs 14, and rear legs 18 form an inverted "Y" configuration when stroller frame 10 is in operating position as shown in FIG. 1. Seat supports 40 normally support the baby seat (not shown), and also interconnect rear legs 18 to front legs 14 from pivot fittings 24 on rear legs 18 to pivot points 42 on front legs 14.

Handles 44 are mounted atop handle tubes 46, and handle tubes 46 fit into and slide within lower outer tubes 34. This telescoping movement provides two advantages. One advantage is that the position of the handles can be adjusted for the height and the ergonomic comfort of the user and can be locked by conventional detents (not shown). However, the more important benefit is that handles 44 can be pushed down to the very tops of lower outer tubes 34. It is this positioning that provides one aspect of the substantially reduced length of stroller frame 10 when it is folded. This feature is discussed in greater detail in reference to FIG. 3. Another structure that is described later, but the orientation of which is shown clearly in FIG. 1, is canopy mounting fixture 48 that supports canopy frame 50 on track 52.

Figure 2:
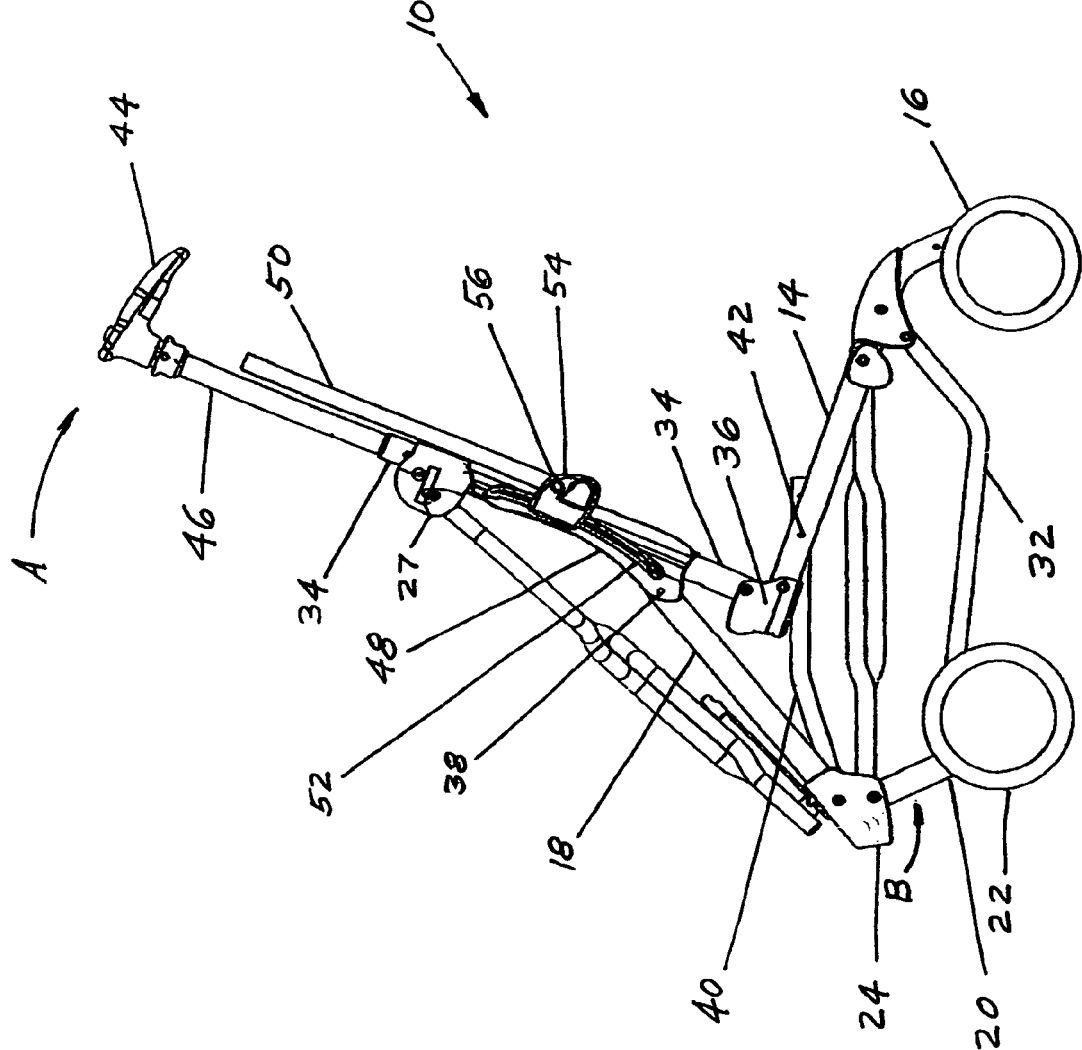
FIG. 2 is a side view of the stroller frame of the preferred embodiment as it appears when it is partially folded.

FIG. 2 is a side view of stroller frame 10 of the preferred embodiment as it appears when it is partially folded. This view provides a better understanding of the various pivoting parts that provide the benefits of the present invention. The movement of rear wheel 22 during folding is particularly apparent in FIG. 2.

The longitudinal folding action is essentially initiated by moving handles 44 forward, in direction A, relative to front wheels 16. This action causes lower outer tubes 34 to pivot within pivot fitting 36 out of their original orientation parallel to front legs 14 and to move handles 44 toward the front of stroller frame 10. This action is common in the prior art, and as can be seen from FIG. 2, seat supports 40, which interconnect rear legs 18 at pivot fittings 24 to front legs 14 at pivot points 42, move rear legs 18 toward a horizontal folded orientation. As can be appreciated from FIG. 2, if rear wheels 22 were conventionally mounted on straight extensions (not shown) of rear legs 18, rear legs would move farther away form front wheels 16 as rear legs 18 tilted toward the horizontal orientation. It should also be appreciated that all the movement that occurs between each rear leg and its attached front leg is in the plane defined by that rear leg and the front leg to which it is attached.

However, in the present invention, as seen in both FIG. 1 and FIG. 2, rear wheels 22 are attached to wheel links 20 that are interconnected with front legs 14, by fixed length basket supports 32 that pivot at both wheel links 20 and front legs 14. Since wheel links 20 are attached to rear legs 18 at pivot fitting 24, as rear legs 18 move down toward their horizontal orientation, wheel links 20 rotate relative to rear legs 18, as indicated by arrow B. Thus, rear wheels 22 maintain their approximate previous distance from front wheels 16 significantly reducing the length of the stroller when it is fully folded.

Figure 3:
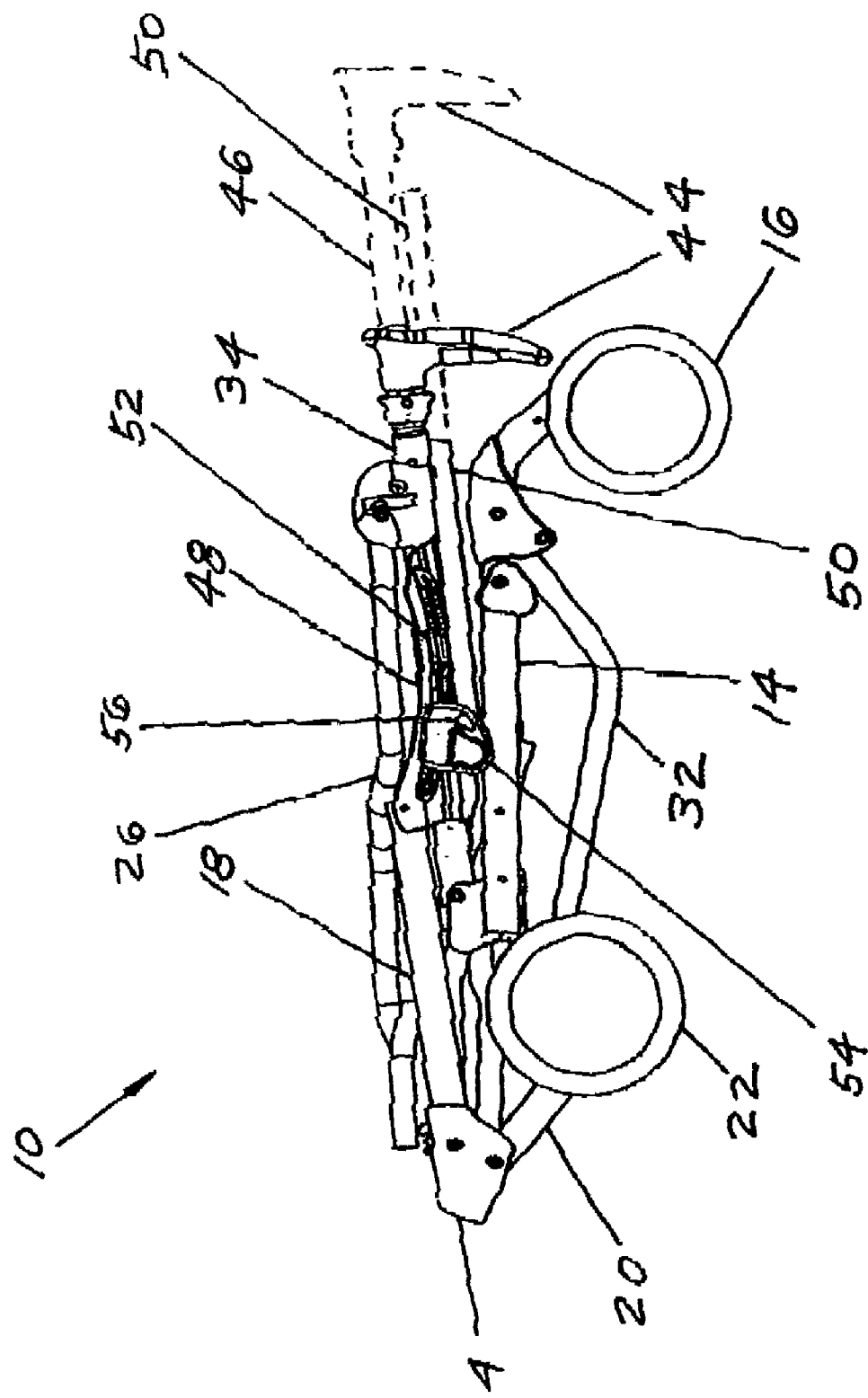
FIG. 3 is a side view of the stroller frame of the preferred embodiment as it appears when it is completely folded and collapsed into its minimum size.

FIG. 3 is a side view stroller frame 10 of the preferred embodiment as it appears when it is completely folded and collapsed into its minimum size. As is clearly seen in the comparisons between FIG. 1, FIG. 2, and FIG. 3, rear wheels 22 maintain the same distance from front wheels 16 in all the drawings. This distance is essentially determined by the lengths of basket supports 32, rear legs 18, and wheel links 20.

FIG. 3 also shows the other features that reduce the overall length of folded stroller frame 10. One is the ability to move canopy frame 50 in toward the center of folded stroller frame 10, as indicated by the difference between the solid and phantom lines showing canopy frame 50, so that entire canopy frame 50 is located between front wheels 16 and rear wheels 22. This is accomplished by attaching canopy frame 50 to lower outer tube 34 with fixture 48 which includes "T" shaped track 52 upon which canopy frame 50 is mounted by the use of sliding fixture 54. Thus, when release button 56 on sliding fixture 54 is depressed, canopy frame 50 can be slid along track 52 and be located well toward the center of stroller frame 10 when stroller frame 10 is folded. Furthermore, as seen in FIG. 1, when stroller frame 10 is in its unfolded operating position, track 52 permits canopy frame 50, and it child protecting canopy (not shown) to be adjusted up and down for the size and comfort of the child.

Another important folded length reducing feature of the present invention is the telescoping structure of lower outer tubes 34 and handle tubes 46. Prior art strollers do not have this capability because support and strengthening structures such as rear legs 18, rear "X" support 26, and canopy frame 50 have been connected to lower outer tubes 34 with fasteners that penetrated the interiors of lower outer tubes 34 and prevented movement of handle tube 46 within lower outer tube 34. The present invention attaches all the necessary structures to lower outer tubes 34, but does so while keeping the interior of lower outer tube 34 clear. The structure for accomplishing this attachment is described in regard to FIGS. 4, 5, and 6.

Figure 4:
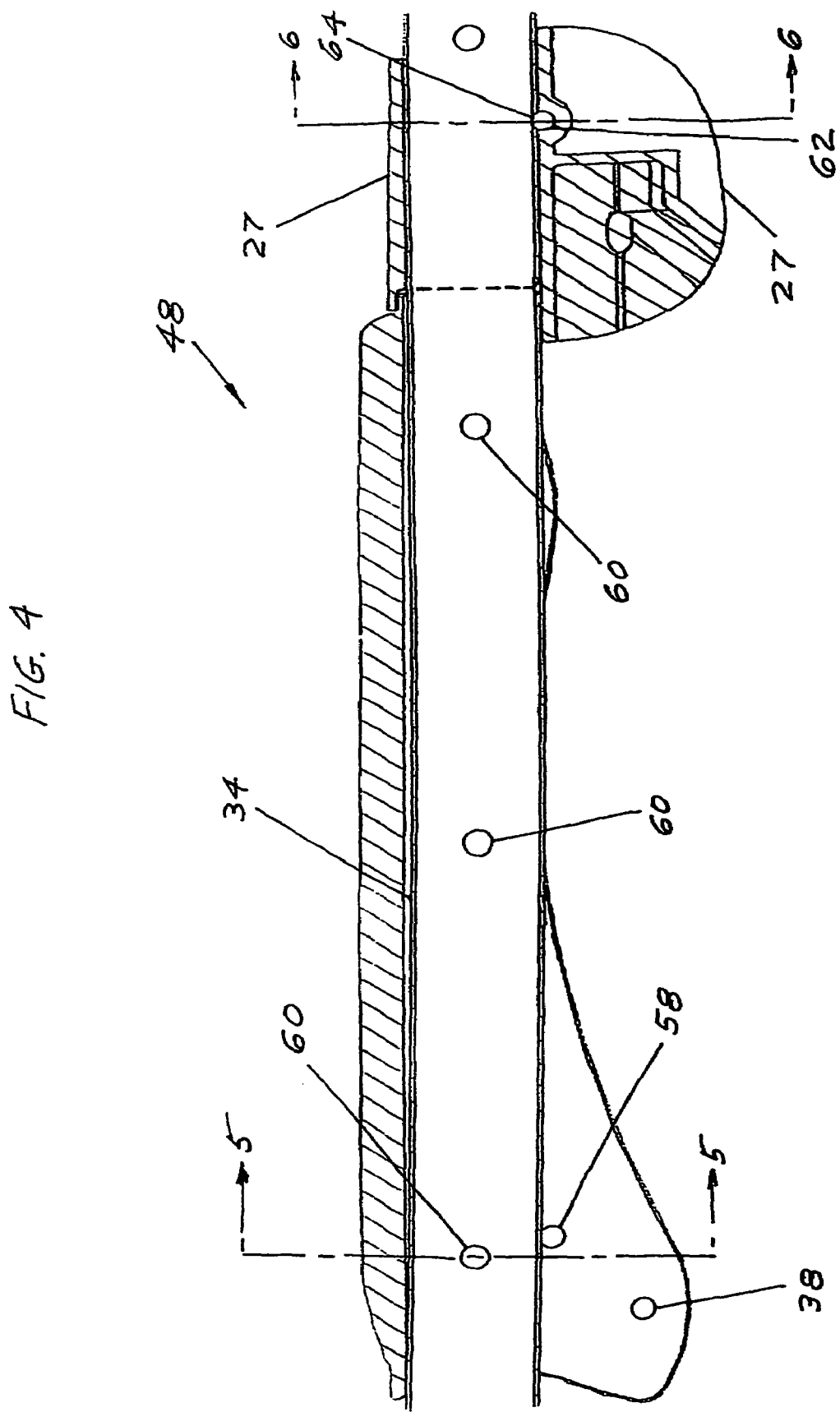
FIG. 4 is a cross section view along the length of the fixtures that hold the rear legs, the rear "X" support, and the canopy frame on the lower outer tubes of the stroller's side frames.
Figure 5:
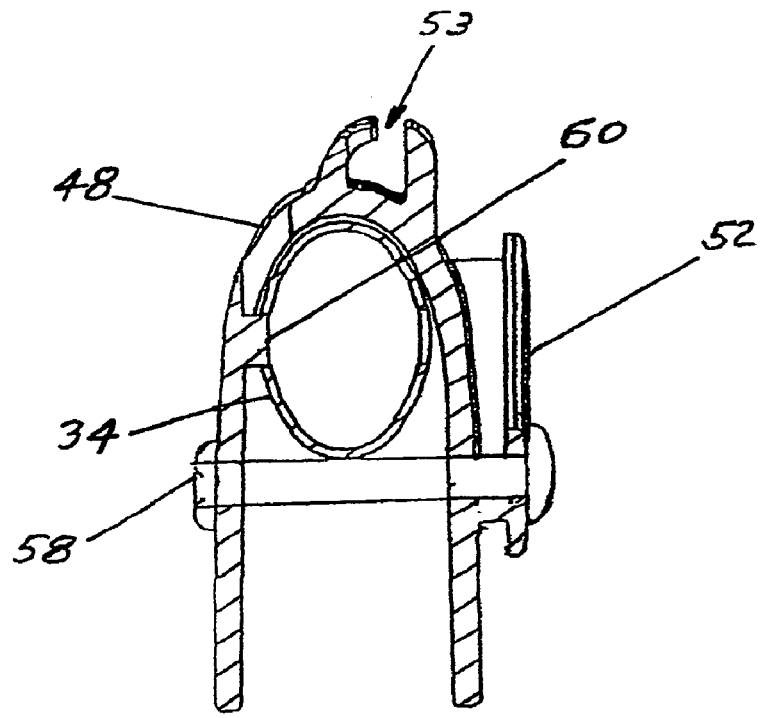
FIG. 5 is a cross section view of the fixture of FIG. 4 taken at section line 5—5.
Figure 6:
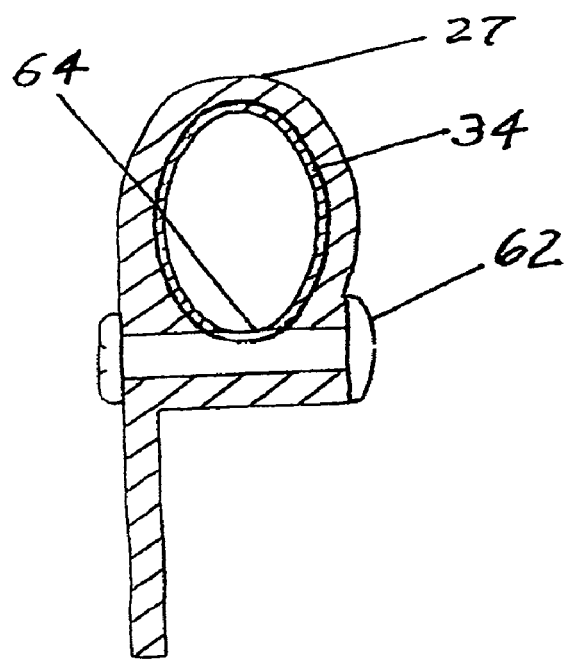
FIG. 6 is a cross section view of the fixture of FIG. 4 taken at section line 6—6.

FIG. 4 is a cross section view along the lengths of canopy mounting fixtures 48 and "X" pivot fixtures 27, and FIG. 5 is a cross section view of canopy mounting fixture 48 of FIG. 4 taken at section line 5—5. Canopy mounting fixtures 48 include tracks 52 for holding and sliding canopy frame 50 and seat retaining slots 53, and canopy mounting fixtures 48 also hold rear legs 18 at pivot point 38. Canopy mounting fixtures 48 are essentially "U" clamps tightened around lower outer tubes 34 by the use of fasteners 58. Bosses 60 are formed into canopy mounting fixtures 48 and penetrate only the walls of lower outer tubes 34 without significantly protruding into the space within lower outer tubes 34. Bosses 60 thereby prevent canopy mounting fixtures 48 from sliding on lower outer tubes 34, but permit handle tubes 46 to slide inside lower outer tubes 34. "X" pivot fixtures 27 holds rear "X" supports 26 onto lower outer tubes 34 of the stroller's side frame sections 12. FIG. 6 is a cross section view of "X" pivot fixture 27 of FIG. 4 taken at section line 6—6. "X" pivot fixtures 27 are formed to slip over lower outer tubes 34 with close clearance and are kept from sliding on lower outer tubes 34 by rivet 62 which is positioned to fit into notch 64 in the wall of lower outer tube 34.

The structure of canopy mounting fixture 48 and "X" pivot fixtures 27 thereby permits the attachment of all the necessary structures to the stroller's side frame sections 12, but keeps the interiors of lower outer tubes 34 clear to permit the telescoping storage of handle tubes 46 within lower outer tubes 34 to reduce the length of the folded stroller.

Together with the previously described reductions of length of the folded stroller from the features of the pivoting of the rear wheels and of the sliding of the canopy frame inward, the present invention provides a significantly shorter and more easily transported folded stroller.

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims. For example, front legs 14 can have only one wheel on each leg, or some other apparatus could be used for folding the stroller in its width dimension. Moreover, the handle structure can be a single handle attached to both handle tubes.

What is claimed as new and for which Letters Patent of the United States are desired to be secured is:

1. A folding baby stroller frame comprising:
    two front legs interconnected by and separated from each other by a width folding apparatus that permits the two front legs to move toward and away from each other;
    at least one front wheel mounted on each front leg;
    a rear leg interconnected with each front leg at a first pivoting fixture that permits the rear leg to pivot in a plane that includes the front leg;
    a wheel link with a first end attached to each rear leg at a second pivoting fixture that permits the wheel link to be in a position essentially in line with its rear leg and to pivot toward the at least one front wheel in a plane defined by the rear leg to which the wheel link is attached and the front leg to which its rear leg is interconnected;
    a rear wheel mounted on a second end of each wheel link; and
    a pivoting support interconnecting said second end of each wheel link to the front leg to which its rear leg is connected with the pivoting support pivoting at both the wheel link and the front leg.

2. The folding baby stroller frame of claim 1 further including a third pivoting fixture within the length of each front leg, located between the first pivoting fixture and the pivoting support and permitting the top of each front leg to fold forward toward the at least one forward wheel and pivot in the plane determined by the front leg and the attached rear leg.

3. The folding baby stroller frame of claim 1 wherein the pivoting supports also support an accessories basket.

4. The folding baby stroller frame of claim 1 further including a canopy frame with ends interconnected with the two front legs by a canopy mounting fixture that includes a sliding structure, which, when the stroller is folded, permits the canopy frame to be moved far enough toward the rear wheels to place the entire canopy frame between the front wheels and the rear wheels.

* * * * *